United States Patent [19]

Boulos et al.

[11] Patent Number: 5,130,046
[45] Date of Patent: Jul. 14, 1992

[54] PAINT STRIPPING COMPOSITION CONTAINING SILICA MICROPARTICLES AND POLAR CO-THICKENING AGENT

[75] Inventors: Mervet S. Boulos, Troy; Harry R. Charles, Mt. Clemens; Dean L. Miles, Troy; Michael L. Albu, Garden City, all of Mich.

[73] Assignee: PPG Industries, Inc., Pittsburgh, Pa.

[21] Appl. No.: 387,320

[22] Filed: Jul. 28, 1989

[51] Int. Cl.$^5$ .................... C09D 9/00; C11D 7/50
[52] U.S. Cl. .................... 252/164; 252/165; 252/166; 252/170; 252/DIG. 8; 134/38
[58] Field of Search .............. 252/DIG. 8, 153, 166, 252/170, 164, 165; 134/38

[56] References Cited

U.S. PATENT DOCUMENTS

| | | | |
|---|---|---|---|
| 4,120,810 | 10/1978 | Palmer | 252/153 |
| 4,274,884 | 6/1981 | Cartwright | 134/4 |
| 4,276,186 | 6/1981 | Bakos et al. | 252/158 |
| 4,381,248 | 4/1983 | Lazar | 252/118 |
| 4,579,627 | 4/1986 | Brailsford | 156/655 |
| 4,666,626 | 5/1987 | Francisco | 252/153 |
| 4,965,010 | 10/1990 | Scott | 252/170 |

FOREIGN PATENT DOCUMENTS 0309795 4/1989 European Pat. Off.
88/08445 11/1988 PCT Int'l Appl.

OTHER PUBLICATIONS

"CAB-O-SIL® Fumed Silica Properties and Functions", by Degussa Corp., pp. 1-36.

Primary Examiner—Prince Willis, Jr.
Assistant Examiner—J. Silbermann
Attorney, Agent, or Firm—Daniel J. Long; Godfried R. Akorli

[57] ABSTRACT

Disclosed herein is an effective stripping composition which is particularly useful in the removal of paint from paint booths, said stripping composition comprising a solvent and an effective thickening agent combination of silica microparticles and a co-thickening agent such as a metal salt.

7 Claims, No Drawings

PAINT STRIPPING COMPOSITION CONTAINING SILICA MICROPARTICLES AND POLAR CO-THICKENING AGENT

FIELD OF THE INVENTION

The present invention relates to a paint stripping composition containing thickeners. More specifically, the invention relates to a stripping composition containing fumed silica which is particularly useful in cleaning paint booths.

BRIEF DESCRIPTION OF THE PRIOR ART

Paint stripping compositions are generally known in the art. The stripping action is aided by solvents, common among which is chlorinated solvents which is preferred because of its effectiveness and versatility on various paint compositions. With the advent of environmental regulations, the use of many of these chlorinated solvents has been restricted. Alternate solvents have not been found to be as effective as chlorinate solvents in removing paint. This is all the more so in the use of solvents containing thickeners such as cellulosics. Many of the thickeners prematurely thicken the stripping composition during preparation and/or storage, or otherwise interfere with the paint-removing efficiency of the solvents. The cellulosics, for example, can be difficult to solubilize. Also, in the application of the paint stripping composition, the cellulosic contained therein tend to string and knot.

Hence, there is a need for an improved paint stripping composition, particularly one containing a thickener. By the present invention, a novel paint stripping composition is disclosed.

SUMMARY OF THE INVENTION

In accordance with the foregoing, the present invention encompasses an improved paint stripping composition containing a solvent and a thickening agent. The improvement comprises an effective thickening agent combination of silica microparticles and a co-thickening agent such as a metal salt.

In the present embodiment of the paint stripping composition of this invention, silica microparticles, such as fumed silica, are employed in combination with a co-thickening agent, such as aluminum octoate, in a solvent medium comprising an aromatic solvent. Typically, a wetting agent, such as a surfactant, is employed herewith to wet the painted surface to which the stripping composition has been applied, and/or emulsify the removed paint.

The paint stripping composition of this invention is particularly well suited to use on the paint spray booth vertical walls, floors, grates, exhaust stacks, and the like. The paint stripping composition of this invention effectively removes paint which can be easily washed off with water. Notably, the paint stripping composition does not leave noticeable residues.

DETAILED DESCRIPTION OF THE INVENTION

The silica microparticles useful herein typically are of a small particle size and a high surface area which can be about 50 square meters per frame or higher using Brauner, Emmet and Teller's (BET) standard of measuring surface area by nitrogen absorption method and preferably about 100 to b 400 square meters per gram.

In the presently preferred embodiment of the invention, the silica microparticle useful herein is fumed silica.

Fumed silica is a silicon dioxide, which is produced by hydrolysis of silicon tetrachloride vapor in a flame of hydrogen and oxygen at high temperatures of about 1800° C. fumed silica has a surface area of about 100 to 400 square meters per gram (BET), nominal particle size of about 0.014 to 0.027 microns calculated from BET surface area assuming a spherical particle and bulk density of about 3 to 5 pounds per cubic foot. Fumed silica is described herein with particularity in order to illustrate the silica microparticles useful herein. Thus, silica microparticles which are of the nature of fumed silica is also encompassed by the claimed invention. There is employed herein an amount of about 0.1 to 5 percent and preferably about 0.5 to 2.0 percent by weight of the silica microparticles based on total weight solids of the stripping composition.

The presently preferred co-thickening agents of the invention are soaps such as metal salts, e.g., aluminum octoate; alkali metal salt of acids such as sodium or potassium salts of rosins and modified rosins; fatty acid alkanolamides. Other co-thickening agents which function in essentially the same manner as the metal salts, in accordance with this invention, are also encompassed by the invention. In the main, the co-thickening agents in accordance with this invention are polar. The co-thickening agent is employed in an amount of about 0.1 to 15.0 and preferably about 1.0 to 8.0 percent by weight based on total weight of the stripping composition.

The solvents useful herein are those which can swell, dissolve, delaminate, or otherwise affect the integrity of the paint in a manner that makes it removable by flushing off with an appropriate liquid such as water. The ability of the solvent to remove the paint as set forth is referred to as "stripping efficiency". In accordance with this invention, the solvent and the thickening combination are releasably associated with each other. By "releasably associated" is herein means that while the thickening agent combination effectively holds the solvent onto the metal surface, the paint stripping efficiency, however, is not interfered with. Thus, the solvent can be held on the painted surface for a period of time sufficient to enable it to effectively remove the paint in the manner as set forth herein.

Typically, the solvent or mixture of solvents useful herein can be essentially the same as the solvent that was employed in making the paint that is being removed. The solvent, as to its nature or amount, will depend on the type of paint that is being removed. Usually, a mixture of paint-dissolving and paint-undercutting (delaminating) solvents are employed. Nonlimiting examples of the preferred solvents can be high-boiling aromatic hydrocarbon solvents having a boiling point of 150° C. or higher, for example, SOLVESSO 150, available from Exxon Oil Co.; Solvent 150, available from Shell Oil Co., oxohexyl acetate, n-butyl acetate, and methyl pyrrolidones. Other solvents useful herein can be alcohols, other hydrocarbons, ketones, pyrrolidones; ethers and chlorinated hydrocarbons preferably in limited but safe amounts.

A surfactant can be employed in the stripping composition to aid in wetting the paint surface during application and/or to aid in the removal of the stripped paint by, say, emulsifying the stripped paint. The useful surfactants are typically nonionic and anionic surfactants. Non-limiting examples of these surfactants can be sodium dialkylsulfosuccinates where the alkyl group can be, say, an isobutyl, or hexyl group; alkanolamides and the like. The surfactants and, for that matter, other wetting agents are not intended as thickening agents.

Other ingredients of the stripping composition can be mineral oils, such as FAXANE 22 from Exxon Oil Co.; fatty oils, such as RAYBO 6, RAYBO 94, and the like from Raybo Chemicals; and tall iols such as CA-304, CA-330 from Chemical Assoc. Inc. In accordance with this invention, the performance of the stripping composition is improved when it contains the mineral or fatty oils. The mineral or fatty oils can be employed in an amount of about 0.1 to 10 weight percent and preferably about 0.5 to 5.0 percent by weight based on the total weight of the stripping composition.

The stripping composition can be prepared by admixing the aforestated ingredients. The composition can be formulated to cover a wide range of viscosities, e.g., from 200 to over 4,000 centipoises.

Painted surfaces to which the stripping composition can be applied can be paint booths, tote tanks, storage containers, paint application equipment including robots, belts, spray guns and the like. The stripping composition is preferably applied by spraying. Other method of application can, of course, be employed. In the practice of the invention, the stripping composition can be applied over the painted surface, preferably in a uniform layer and allowed to strip the paint for a sufficient time, i.e., for about 10 to 45 minutes. The applied composition and stripped paint are then washed off the surface with a liquid such as water. The stripping composition has been found to be effective in removing paints containing different resins such as polyesters, polyurethanes, acrylics, melamine resins, and the like.

It is a distinct feature of the invention that the thickening agent combination of the stripping composition, unlike the prior art compositions, does not adversely affect the paint-stripping efficiency of the solvent used herein. It is also a distinct feature of the invention that the stripping composition has excellent rinsability. Consequently, the composition of this invention does not leave a residual film.

These and other aspects of the invention are further illustrated by the following nonlimiting examples.

EXAMPLE 1

This example illustrates the paint stripping composition of this invention and a method of preparing the same.

| Ingredients | Parts by Weight (grams) |
| --- | --- |
| Aromatic solvent[1] | 83.2 |
| Oxohexyl acetate | 5.0 |
| Fumed silica | 1.0 |
| DRESINATE X[2] | 8.0 |
| RAYBO 94[3] | 3.0 |

[1]Aromatic solvent having a flash point of 150° C. maximum, such as SOLVESSO 150, available from Exxon Oil Co.
[2]DRESINATE X consists of sodium and potassium salts of rosins and modified rosins, available from Hercules Company.
[3]RAYBO 94 consists of fatty oils, available from Raybo Chemical Company.

One-third of the amount of aromatic solvent was mixed with all of the DRESINATE at low speed. The resultant admixture was mixed with the remaining aromatic solvent. The oxohexyl acetate, fumed silica, and RAYBO 94 were added sequentially with mixing for 15 minutes between each addition. The resultant mixture was further mixed with a propeller for two hours. The final product had a viscosity of 1,900 to 2,200 centipoises. The resultant paint stripping composition was effective in stripping paint as more fully described in Example 4, hereinafter.

EXAMPLE 2

This example further illustrates the paint stripping composition of this invention which was prepared in essentially the same manner as described in Example 1. The following were used in the preparation:

| Ingredients | Parts by Weight (grams) |
| --- | --- |
| Solvent 150[1] | 93.3 |
| MONAMIDE 150 AD[2] | 2.5 |
| Triton X-45[3] | 1.0 |
| Mineral Oil | 0.7 |
| Fumed Silica | 2.5 |

[1]Aromatic solvent available from Shell Oil Co.
[2]Coconut alkanolamide from Mona Industries, Inc.
[3]Octylphenoxy polyethoxy ethanol from Rohm and Haas Co.

EXAMPLE 3

This example further illustrates the paint stripping composition of this invention which was prepared in essentially the same manner as described in Example 1. The following were used in the preparation:

| Ingredients | Parts by Weight (grams) |
| --- | --- |
| Solvent 150 | 89.0 |
| Oxohexyl Acetate | 4.0 |
| MONAWET MM80[1] | 1.5 |
| Fumed Silica | 1.0 |
| DRESINATE X | 3.0 |
| RAYBO 94 | 1.5 |

[1]Dihexyl sodium sulfosuccinate from Mona Industries, Inc.

EXAMPLE 4

The paint stripping composition of Example 1 was applied with a spray pump on a paint spray booth surface coated with an uncured base coat and top cot wherein the base coat is, for example, a polyester polyol-polyurethane polyol-melamine resin system available as UBC 8554 resin coatings, and wherein the top coat is, for example, a lacquer containing an acrylic polymer available as WALD 3967, both of which are from PPG Industries, Inc. After about 15 to 30 minutes, the surface was rinsed by spraying water thereon at low pressure. The paint was removed from the surface and no visible residues were left thereon.

While the illustrative embodiments of the invention have been described hereinabove, it will be understood that various modifications will be apparent to and can be made by those skilled in the art without departing from the scope or spirit of the invention. Accordingly, it is intended that the claims directed to the invention be construed as encompassing all aspects of the invention which would be treated as equivalents by those skilled in the art to which the invention pertains.

We claim:

1. An improved paint stripping composition containing a solvent selected from a high boiling aromatic hydrocarbon having a boiling point of 150° C. or higher, oxohexyl acetate and mixtures thereof and a thickening agent, the improvement comprising an effective thickening agent combination of more than about 0.5 percent to about 5 1 percent by weight based on the total weight of the composition of silica microparticles and more than about 1.0 to about 15.0 percent by weight based on the total weight of the composition of a polar co-thickening agent selected from the group consisting of aluminum octoate, a sodium or potassium salt of a rosin or modified rosin and a fatty acid alkanolamide.

2. The paint stripping composition of claim 1 wherein the silica microparticles have a surface area greater than 50 square meters per gram (BET).

3. The paint stripping composition of claim 1 wherein the silica microparticles comprise fumed silica.

4. The paint stripping composition of claim 1 wherein the silica microparticles are present in an amount of about 0.5 percent to 2.0 percent by weight.

5. The paint stripping composition of claim 1 wherein the co-thickening agent is present in an amount of about 1.0 percent to 8.0 percent by weight.

6. A method of stripping paint from a painted surface comprising:
 (i) depositing a layer of a paint stripping composition as recited in claim 1,
 (ii) allowing the deposited stripping composition to remove the paint followed by
 (iii) rinsing the surface with a liquid.

7. A method of stripping paint from a surface as recited in claim 6 which is the surface of a paint spray booth.

* * * * *

UNITED STATES PATENT AND TRADEMARK OFFICE
CERTIFICATE OF CORRECTION

PATENT NO. : 5,130,046

DATED : July 14, 1992

INVENTOR(S) : Mervet S. Boulos et al

It is certified that error appears in the above-identified patent and that said Letters Patent is hereby corrected as shown below:

Column 4, line 67, delete "more than".

Column 4, line 68, change "51 percent" to --5 percent--.

Signed and Sealed this

Twenty-fourth Day of August, 1993

Attest:

BRUCE LEHMAN

Attesting Officer

Commissioner of Patents and Trademarks